(12) United States Patent
Lee

(10) Patent No.: US 12,191,700 B2
(45) Date of Patent: Jan. 7, 2025

(54) DEVICE AND METHOD FOR MANAGING BATTERIES OF VEHICLE

(71) Applicants: HYUNDAI MOTOR COMPANY, Seoul (KR); KIA CORPORATION, Seoul (KR)

(72) Inventor: Yoon Jun Lee, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/375,237

(22) Filed: Sep. 29, 2023

(65) Prior Publication Data
US 2024/0039323 A1   Feb. 1, 2024

Related U.S. Application Data

(63) Continuation of application No. 17/090,040, filed on Nov. 5, 2020, now Pat. No. 11,811,256.

(30) Foreign Application Priority Data

Jun. 30, 2020   (KR) .................. 10-2020-0080427

(51) Int. Cl.
| | |
|---|---|
| H02J 7/00 | (2006.01) |
| G01K 1/02 | (2021.01) |
| G01K 1/14 | (2021.01) |

(52) U.S. Cl.
CPC ........ H02J 7/007194 (2020.01); G01K 1/026 (2013.01); G01K 1/14 (2013.01); H02J 7/0013 (2013.01); H02J 7/0047 (2013.01)

(58) Field of Classification Search
USPC ........ 320/106, 107, 108, 109, 110, 132, 134
See application file for complete search history.

(56) References Cited

U.S. PATENT DOCUMENTS

| | | | |
|---|---|---|---|
| 2004/0257089 A1 | 12/2004 | Aridome | |
| 2015/0132615 A1* | 5/2015 | Yun ..................... | H01M 10/488 429/61 |
| 2019/0064282 A1 | 2/2019 | Haga et al. | |
| 2019/0140225 A1 | 5/2019 | Inoue | |
| 2020/0259354 A1 | 8/2020 | Uchida et al. | |

FOREIGN PATENT DOCUMENTS

| | | | | |
|---|---|---|---|---|
| JP | 4587975 B2 | 9/2010 | | |
| JP | 6183242 B2 * | 8/2017 | ............. | B60L 58/10 |

* cited by examiner

*Primary Examiner* — Brian Ngo
(74) *Attorney, Agent, or Firm* — Lempia Summerfield Katz LLC

(57) ABSTRACT

A device and a method for managing batteries of a vehicle are disclosed. The device may include: batteries arranged in a vehicle, a plurality of temperature sensors mounted at different locations of the batteries, and a controller that, when a failure occurs at an arbitrary temperature sensor among the plurality of temperature sensors, estimates a temperature value at the failed temperature sensor using big data, and controls discharge of the batteries based on the estimated temperature value.

18 Claims, 4 Drawing Sheets

DEVICE AND METHOD FOR MANAGING BATTERIES OF VEHICLE

CROSS-REFERENCE TO RELATED APPLICATION

This application is a continuation application of non-provisional U.S. patent application Ser. No. 17/090,040, filed on Nov. 5, 2020, which claims priority to and the benefit of Korean Patent Application No. 10-2020-0080427, filed on Jun. 30, 2020, the entire contents of each of which are incorporated herein by reference.

FIELD

The present disclosure relates to a technology for managing batteries arranged in a vehicle using big data.

BACKGROUND

The statements in this section merely provide background information related to the present disclosure and may not constitute prior art.

In general, a battery management system (BMS) disposed in a vehicle may limit discharge of a battery (power supply to a load) when a temperature of the battery is equal to or higher than an upper limit value (e.g., 70° C.) or equal to or lower than a lower limit value (e.g., −40° C.) to prevent deterioration of the battery (a high voltage battery or a low voltage battery) from accelerating.

As an example, in a state in which a first temperature sensor, a second temperature sensor, and a third temperature sensor are respectively arranged at predetermined locations of the battery, the first temperature sensor measures 60° C., and each of the second temperature sensor and the third temperature sensor measures 45° C. When not receiving the temperature measured by the first temperature sensor, but receiving only the temperature measured by the second temperature sensor and the third temperature sensor because disconnection occurs at a line for connecting the BMS with the first temperature sensor, the BMS does not limit the discharge of the battery by determining the temperature of the battery as 45° C. despite a temperature of a specific location of the battery (the location where the first temperature sensor is mounted) is 60° C. Therefore, the deterioration of the battery may be accelerated.

As another example, in the state in which the first temperature sensor, the second temperature sensor, and the third temperature sensor are respectively arranged at the predetermined locations of the battery, the first temperature sensor measures −36° C., and each of the second temperature sensor and the third temperature sensor measures −21° C. When not receiving the temperature measured by the first temperature sensor, but receiving only the temperature measured by the second temperature sensor and the third temperature sensor because the disconnection occurs at the line for connecting the BMS with the first temperature sensor, the BMS does not limit the discharge of the battery by determining the temperature of the battery as −21° C. despite the temperature of the specific location of the battery (the location where the first temperature sensor is mounted) is −36° C. Therefore, the deterioration of the battery may be accelerated.

In the end, the conventional BMS does not limit the discharge of the battery even though the discharge of the battery should be limited when a failure (e.g., the disconnection) occurs at a temperature sensor measuring the highest temperature of the battery or a temperature sensor measuring the lowest temperature of the battery, thereby accelerating the deterioration of the battery.

The matters described in this background art part are written to improve the understanding of the background of the present disclosure, and may include matters other than the prior art already known to those skilled in the art to which this technology belongs.

SUMMARY

The present disclosure has been made to solve the above-mentioned problems occurring in the prior art while advantages achieved by the prior art are maintained intact.

An aspect of the present disclosure provides a device and a method for managing batteries of a vehicle that, when a failure has occurred at an arbitrary temperature sensor among a plurality of temperature sensors arranged on the batteries of the vehicle, may estimate a temperature value at the temperature sensor where the failure (e.g., disconnection) has occurred using big data accumulated from operations of the batteries, and manage discharge of the batteries based on the estimated temperature value and temperature values of the remaining temperature sensors, thereby preventing acceleration of battery deterioration.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for managing batteries of a vehicle includes the batteries arranged in the vehicle, a plurality of temperature sensors mounted at different locations of the batteries, and a controller that, when a failure has occurred at an arbitrary temperature sensor, estimates a temperature value at the temperature sensor where the failure has occurred using big data accumulated from operations of the batteries, and controls discharge of the batteries based on the estimated temperature value.

In one implementation, the controller may estimate the temperature value at the failed temperature sensor based on an average value (A_dT) of difference values between the highest temperatures and the lowest temperatures in respective periods of time, information on a temperature sensor S_MaxT which more frequently measures the highest temperature than other remaining temperature sensors among the plurality of temperature sensors, and temperature values of the remaining temperature sensors.

In one implementation, the controller may calculate a sum of the average value (A_dT) of the difference values between the highest temperatures and the lowest temperatures in the respective periods and a maximum value among the temperature values measured by the remaining temperature sensors when the failed temperature sensor and the temperature sensor S_MaxT with the highest frequency of measuring the highest temperature are mounted at the same locations of respective batteries, and estimates the calculated sum as the temperature value at the failed temperature sensor where the failure has occurred.

In one implementation, the device may further include storage for storing the average value (A_dT) of the difference values between the highest temperatures and the lowest temperatures in the respective periods of time, and the information on the temperature sensor S_MaxT with the highest frequency of measuring the highest temperature.

In one implementation, the controller may collect the average value A_dT of the difference values between the highest temperatures and the lowest temperatures in the respective periods of time, and the information on the temperature sensor S_MaxT with the highest frequency of measuring the highest temperature from a data server when the failure has occurred at the arbitrary temperature sensor.

In one implementation, the data server may periodically collect temperature values measured by the plurality of temperature sensors mounted on the batteries of the same vehicle, calculate the difference values between the highest temperatures and the lowest temperatures in the respective periods of time, and calculate the average value A_dT of the difference values in an accumulating manner, and repeatedly identify the temperature sensor S_MaxT with the highest frequency of measuring the highest temperature.

In one implementation, the data server may discard a temperature value collected when a failure has occurred at the batteries of the same vehicle without using as big data.

In one implementation, the controller may estimate the temperature value of the temperature sensor where the failure has occurred based on an average value A_dT of difference values between the highest temperatures and the lowest temperatures in respective periods of time, information on a temperature sensor S_MinT which more frequently measures the lowest temperature than other remaining temperature sensors among the plurality of temperature sensors, and temperature values of remaining temperature sensors.

In one implementation, the controller may subtract the average value A_dT of the difference values between the highest temperatures and the lowest temperatures in the respective periods of time from a minimum value among the temperature values measured by the remaining temperature sensors when the failed temperature sensor and the temperature sensor S_MinT are mounted at the same locations of respective batteries, and estimate the subtraction result (i.e., subtracted value) as the temperature value at the failed temperature sensor where the failure has occurred.

In one implementation, the device may further include storage for storing the average value A_dT of the difference values between the highest temperatures and the lowest temperatures in the respective periods of time, and the information on the temperature sensor S_MinT with the highest frequency of measuring the lowest temperature.

In one implementation, the controller may collect the average value A_dT of the difference values between the highest temperatures and the lowest temperatures in the respective periods, and the information on the temperature sensor S_MinT with the highest frequency of measuring the lowest temperature from a data server when the failure has occurred at the arbitrary temperature sensor.

In one implementation, the data server may periodically collect temperature values measured by the plurality of temperature sensors mounted on the batteries of the same vehicle, calculate the difference values between the highest temperatures and the lowest temperatures in the respective periods, and calculate the average value A_dT of the difference values in an accumulating manner, and repeatedly identify the temperature sensor S_MinT more frequently measuring the lowest temperature among the plurality of temperature sensor.

In one implementation, the data server may discard a temperature value collected when a failure has occurred at the batteries of the same vehicle without using as big data.

According to another aspect of the present disclosure, a method for managing batteries of a vehicle including the batteries and a plurality of temperature sensors mounted at different locations of the batteries includes: determining, by a controller, whether a failure has occurred at an arbitrary temperature sensor among the plurality of temperature sensors; estimating, by the controller, a temperature value at the failed temperature sensor based on an average value A_dT of difference values between the highest temperatures and the lowest temperatures in respective periods of time, information on a temperature sensor S_MaxT which more frequently measures the highest temperature than other remaining temperature sensors among the plurality of temperature sensors, and temperature values of remaining temperature sensors; and managing, by the controller, discharge of the batteries based on the estimated temperature value.

In one implementation, the estimating of the temperature value of the temperature sensor where the failure has occurred may include collecting the average value A_dT of the difference values between the highest temperatures and the lowest temperatures in the respective periods of time, and the information on the temperature sensor S_MaxT with the highest frequency of measuring the highest temperature from a data server, calculating a sume of the average value A_dT of the difference values between the highest temperatures and the lowest temperatures in the respective periods of time and a maximum value among the temperature values measured by the remaining temperature sensors when the failed temperature sensor and the temperature sensor S_MaxT with the highest frequency of measuring the highest temperature are mounted at the same locations of respective batteries, and estimating the calculated sum as the temperature value at the failed temperature sensor.

In one implementation, the collecting of the information may include periodically collecting temperature values measured by the plurality of temperature sensors mounted on the batteries of the same vehicle, calculating the difference values between the highest temperatures and the lowest temperatures in the respective periods of time, and calculating the average value A_dT of the difference values, and the temperature sensor S_MaxT with the highest frequency of measuring the highest temperature in an accumulating manner.

According to another aspect of the present disclosure, a method for managing batteries of a vehicle including the batteries and a plurality of temperature sensors mounted at different locations of the batteries includes: determining, by a controller, whether a failure has occurred at an arbitrary temperature sensor among the plurality of temperature sensors; estimating, by the controller, a temperature value at the failed temperature sensor based on an average value A_dT of difference values between the highest temperatures and the lowest temperatures in respective periods of time, information on a temperature sensor S_MinT which more frequently measures the lowest temperature than other remaining temperature sensors among the plurality of temperature sensors, and temperature values of the remaining temperature sensors; and managing, by the controller, discharge of the batteries based on the estimated temperature value.

In one implementation, the estimating of the temperature value of the temperature sensor where the failure has occurred may include collecting the average value A_dT of the difference values between the highest temperatures and the lowest temperatures in the respective periods, and the information on the temperature sensor S_MinT with the highest frequency of measuring the lowest temperature from a data server, subtracting the average value A_dT of the difference values between the highest temperatures and the lowest temperatures in the respective periods from a minimum value among the temperature values measured by the remaining temperature sensors when the temperature sensor where the failure has occurred and the temperature sensor S_MinT with the highest frequency of measuring the lowest temperature are temperature sensors mounted at the same locations of respective batteries, and estimating the subtraction result as the temperature value of the temperature sensor where the failure has occurred.

In one implementation, the collecting of the information may include periodically collecting temperature values measured by the plurality of temperature sensors mounted on the batteries of the same vehicle, calculating the difference values between the highest temperatures and the lowest temperatures in the respective periods, and calculating the average value A_dT of the difference values, and the temperature sensor S_MinT with the highest frequency of measuring the lowest temperature in an accumulating manner.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
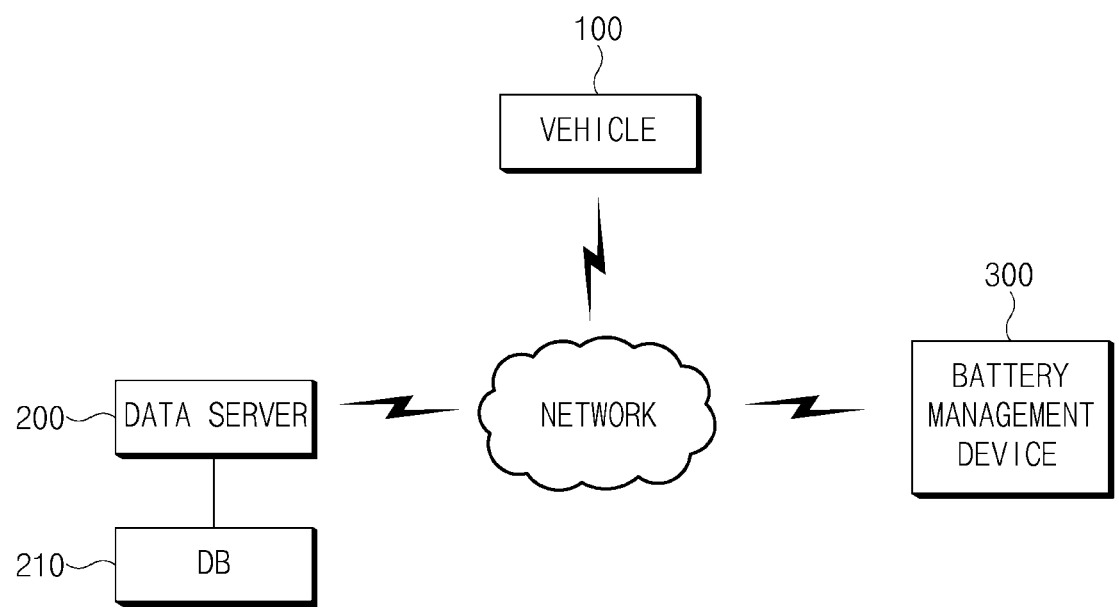
FIG. 1 is a configuration diagram of a battery management system of a vehicle to which one form of the present disclosure is applied.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary forms of the present disclosure, a detailed description of the related known configuration or function will be omitted when it is determined that it interferes with the understanding of the forms of the present disclosure.

In describing the components of some forms according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram of a battery management system of a vehicle to which one form of the present disclosure is applied, and is described with an example of one vehicle 100 for better understanding, but the number of vehicles does not affect the present disclosure.

As shown in FIG. 1, the battery management system of the vehicle may include the vehicle 100, a data server 200, a battery management device 300, and the like.

The vehicle 100 may be connected to the data server 200 through a network, and the vehicle 100 may include a battery management system "BMS" (not shown) and batteries (not shown). In this connection, the BMS may transmit temperature values periodically acquired from a plurality of temperature sensors (not shown) mounted on the batteries to the data server 200. In this connection, the batteries and the plurality of temperature sensors arranged in the vehicle 100 have the same structure as batteries 30 and a plurality of temperature sensors 31 and 32 arranged in the battery management device 300, and locations of the plurality of temperature sensors arranged in the vehicle 100 are also the same as locations of the plurality of temperature sensors 31 and 32 arranged in the battery management device 300.

The data server 200 may periodically collect the temperature values measured by each temperature sensor mounted on the battery from the BMS disposed in the vehicle 100. For example, when a first temperature sensor, a second temperature sensor, and a third temperature sensor are mounted at different locations of the battery disposed in the vehicle 100, the data server 200 may collect a first temperature value, a second temperature value, and a third temperature from the BMS disposed in the vehicle 100. In this connection, the data server 200 may periodically collect temperature values from BMSs respectively arranged in a plurality of vehicles. In addition, the data server 200 may discard a temperature value collected in a state in which a failure has occurred at the battery without using as big data. In addition, the data server 200 may collect the big data by dividing the big data by season or by region to reflect a difference based on a temperature.

The data server 200 may calculate a difference value between the highest temperature and the lowest temperature for each period. For example, the data server 200 may calculate, among the first temperature value (e.g., 55° C.), the second temperature value (e.g., 50° C.), and the third temperature value (e.g., 45° C.) collected from the BMS disposed in the vehicle 100 in a first period, a value (55−45=10° C.) obtained by subtracting the third temperature value, which is the lowest temperature, from the first temperature value, which is the highest temperature. Further, the data server 200 may calculate, among the first temperature value (e.g., 53° C.), the second temperature value (e.g., 51° C.), and the third temperature value (e.g., 45° C.) collected from the BMS disposed in the vehicle 100 in a second period, a value (53−45=8° C.) obtained by subtracting the third temperature value, which is the lowest temperature, from the first temperature value, which is the highest temperature.

The data server 200 may calculate an average of the difference values between the highest temperatures and the lowest temperatures in the respective periods of time.

The data server 200 may calculate a temperature sensor with the highest frequency of measuring the highest temperature and a temperature sensor with the highest frequency of measuring the lowest temperature in an accumulating manner using the temperature values periodically collected from the BMS disposed in the vehicle 100. That is, the data server 200 may update the temperature sensor with the highest frequency of measuring the highest temperature and the temperature sensor with the highest frequency of measuring the lowest temperature for each period. In this connection, the temperature value periodically collected from the BMS disposed in the vehicle 100 includes a source thereof (temperature sensor identification information). As an example, when the temperature value measured by the first temperature sensor is 53° C., temperature information collected by the data server 200 may be 1T53° C. When the temperature value measured by the second temperature sensor is 51° C., the temperature information collected by the data server 200 may be 2T51° C. Further, when the temperature value measured by the third temperature sensor is 45° C., the temperature information collected by the data server 200 may be 3T45° C.

The data server 200 may record, in a database 210, the average of the difference values between the highest temperatures and the lowest temperatures in the respective periods of time, the temperature sensor with the highest frequency of measuring the highest temperature, and the temperature sensor with the highest frequency of measuring the lowest temperature thus calculated.

Hereinafter, a configuration of the battery management device 300 of the vehicle according to one form of the present disclosure will be described in detail with reference to FIG. 2.

Figure 2:
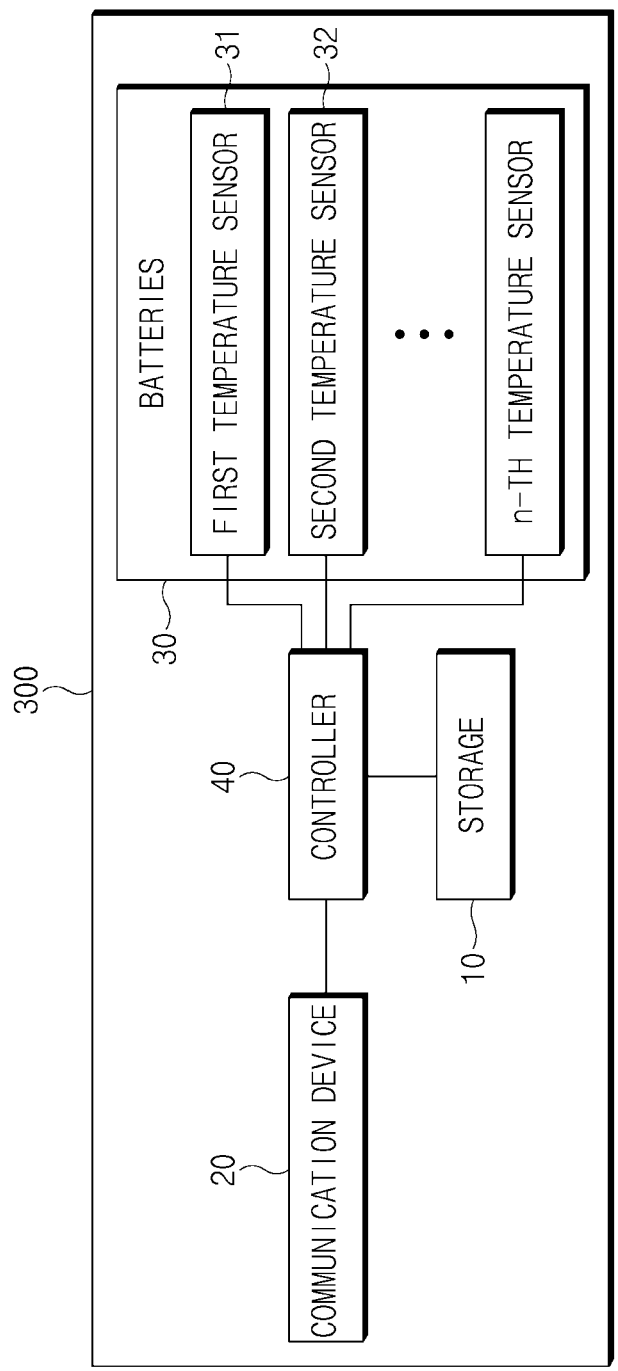
FIG. 2 is a configuration diagram of a battery management device of a vehicle in one form of the present disclosure.

FIG. 2 is a configuration diagram of the battery management device 300 of the vehicle according to one form of the present disclosure;

As shown in FIG. 2, the battery management device 300 of the vehicle may include storage 10, a communication device 20, the batteries 30, and a controller 40. In this connection, depending on a scheme of implementing the battery management device of the vehicle according to one form of the present disclosure, components may be coupled to each other to be implemented as one component, or some components may be omitted.

In a description of each of the components, first, the storage 10 may store various logics, algorithms, and programs required in a process of estimating the temperature of the battery based on the data received from the data server 200 and managing discharge of the batteries based on the estimated battery temperature.

The storage 10 may store an average A_dT of the difference values between the highest temperatures and the lowest temperatures in the respective periods of time, information on a temperature sensor S_MaxT with the highest frequency of measuring the highest temperature, and information on a temperature sensor S_MinT with the highest frequency of measuring the lowest temperature, which are received from the data server 200.

The storage 10 may include a storage medium of at least one type of memory such as a flash memory type, a hard disk type, a micro type, and a card type (for example, a secure digital card (SD card) or an extreme digital card (XD card)), and the like, and memory such as a random access memory (RAM), a static RAM (SRAM), a read only memory (ROM), a programmable ROM (PROM), an electrically erasable PROM (EEPROM), a magnetic RAM (MRAM), a magnetic disk, and an optical disk.

The communication device 20 may provide a communication interface for communication with the data server 200, and may receive the average of the difference values between the highest temperatures and the lowest temperatures in the respective periods of time, the information on the temperature sensor with the highest frequency of measuring the highest temperature, and the information on the temperature sensor with the highest frequency of measuring the lowest temperature from the data server 200.

The batteries 30 may include both a high voltage battery and a low voltage battery, and one or more temperature sensors may be mounted at different locations of the batteries 30. For better understanding, herein, the first temperature sensor 31 and the second temperature sensor 32 will be described as an example.

The controller 40 performs overall control such that each of the components may normally perform a function thereof. Such controller 40 may be implemented in a form of hardware or software, or in a form of a combination of the hardware and the software. In one form, the controller 40 may be implemented as a microprocessor, but may not be limited thereto.

In particular, the controller 40 may estimate the temperature of the battery based on the data received from the data server 200 and perform various controls in the process of managing the discharge of the batteries based on the estimated temperature of the battery.

Hereinafter, an operation of the controller 40 will be described in detail with reference to FIG. 3.

Figure 3:
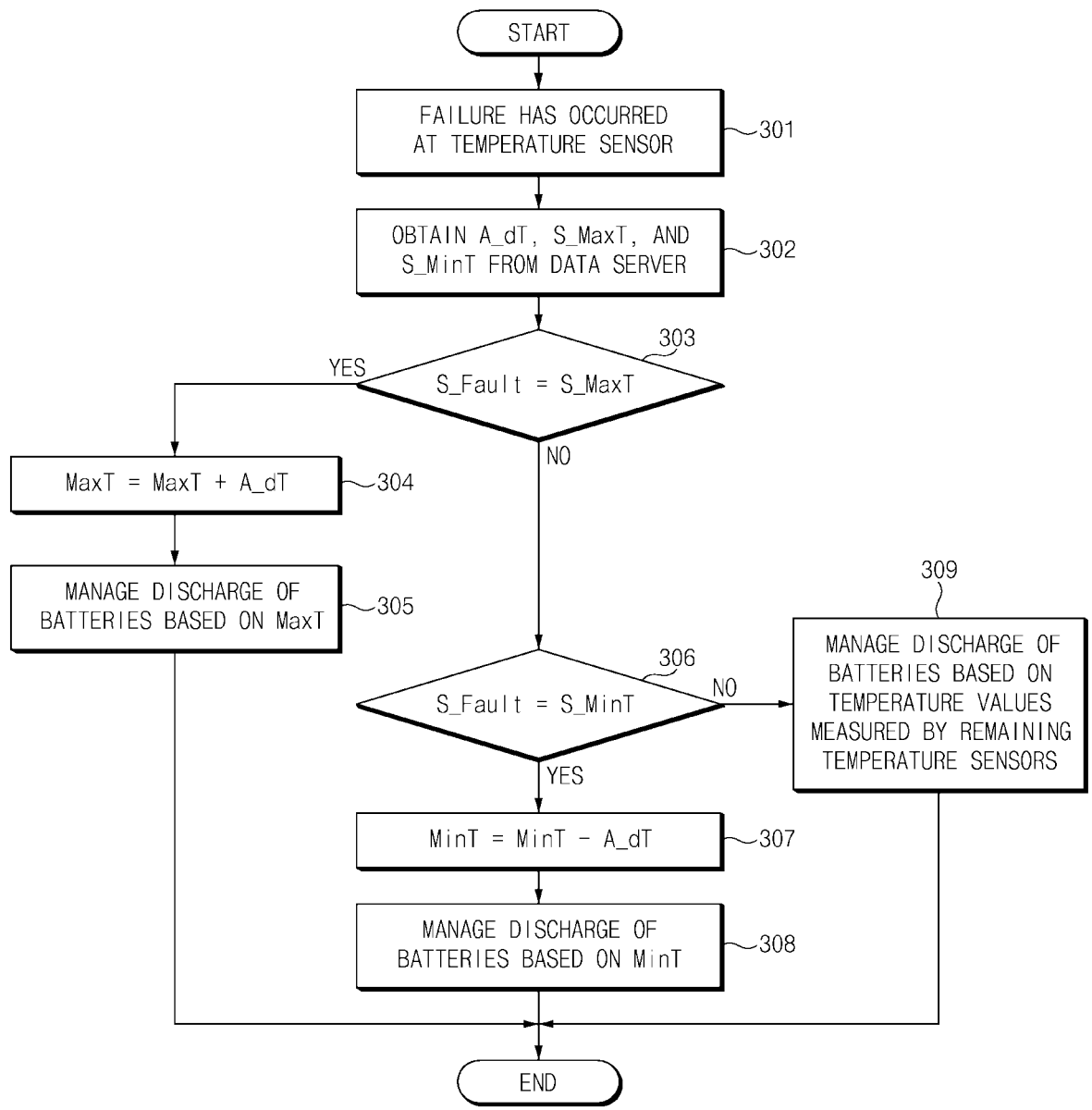
FIG. 3 is a flowchart of a battery management method of a vehicle in one form of the present disclosure.

FIG. 3 is a flowchart of a battery management method of a vehicle in one form of the present disclosure.

First, the controller 40 may determine whether the failure (e.g., the disconnection) has occurred on the plurality of temperature sensors 31 and 32 mounted at the different locations of the battery 30 (e.g., a lower end, a middle portion, an upper end, and the like of the battery) (301). As an example, the controller 40 may determine whether each of the temperature sensors 31 and 32 is disconnected by assigning an input value to each of the temperature sensors 31 and 32 and determining whether an output value corresponding thereto is output.

When the failure has occurred at an arbitrary temperature sensor, the controller may communicate with the data server 200 to obtain the average A_dT of the difference values between the highest temperatures and the lowest temperatures in the respective periods, the information on the temperature sensor S_MaxT with the highest frequency of measuring the highest temperature, and the information on the temperature sensor S_MinT with the highest frequency of measuring the lowest temperature (302). In this connection, the controller 40 may obtain in advance, from the data server 200, the average A_dT of the difference values between the highest temperatures and the lowest temperatures in the respective periods, the information on the temperature sensor S_MaxT with the highest frequency of measuring the highest temperature, and the information on the temperature sensor S_MinT with the highest frequency of measuring the lowest temperature, and store the same in the storage 10.

The controller 40 compares a temperature sensor (S_Fault) where the failure has occurred and the temperature sensor S_MaxT with the highest frequency of measuring the highest temperature with each other to determine whether the temperature sensor (S_Fault) and the temperature sensor S_MaxT are mounted at the same locations of respective batteries (303). That is, the controller 40 determines that the temperature sensor (S_Fault) and the temperature sensor S_MaxT are the same temperature sensor when the temperature sensor (S_Fault) where the failure has occurred is a temperature sensor located at a center of a first battery and the temperature sensor S_MaxT with the highest frequency of measuring the highest temperature is a temperature sensor located at a center of a second battery. In this connection, the first battery and the second battery are batteries of the same type.

When the temperature sensor (S_Fault) and the temperature sensor S_MaxT are at the same locations as a result of the determination (303), the controller 40 sums a maximum value among temperature values measured by the remaining temperature sensors and the average A_dT of the difference values between the highest temperatures and the lowest temperatures in the respective periods, and estimates the summation result as a temperature of the temperature sensor (S_Fault) where the failure has occurred (304).

Thereafter, the controller 40 may manage the discharge of the batteries based on the estimated temperature value (305).

When the temperature sensor (S_Fault) and the temperature sensor S_MaxT are not at the same locations as the result of the determination (303), the temperature sensor (S_Fault) where the failure has occurred and the temperature sensor S_MinT with the highest frequency of measuring the lowest temperature may be compared with each other to determine whether the temperature sensor (S_Fault) and the temperature sensor S_MinT are mounted at the same locations of respective batteries (306).

When the temperature sensor (S_Fault) and the temperature sensor S_MinT are at the same locations as the result of the determination (306), the controller 40 subtracts the average A_dT of the difference values between the highest temperatures and the lowest temperatures in the respective periods from a minimum value among temperature values measured by the remaining temperature sensors, and estimates the subtraction result as the temperature of the temperature sensor (S_Fault) where the failure has occurred (307).

Thereafter, the controller 40 may manage (control) the discharge of the batteries based on the estimated temperature value (308).

When the temperature sensor (S_Fault) and the temperature sensor S_MinT are not at the same locations as the result of the determination (306), the controller 40 manages the discharge of the batteries based on the temperature values measured by the remaining temperature sensors (309).

Eventually, the controller 40 may estimate the temperature value of the temperature sensor where the failure has occurred based on information estimated through the big data, and manage (control) the discharge of the batteries 30 based on the estimated temperature value.

Figure 4:
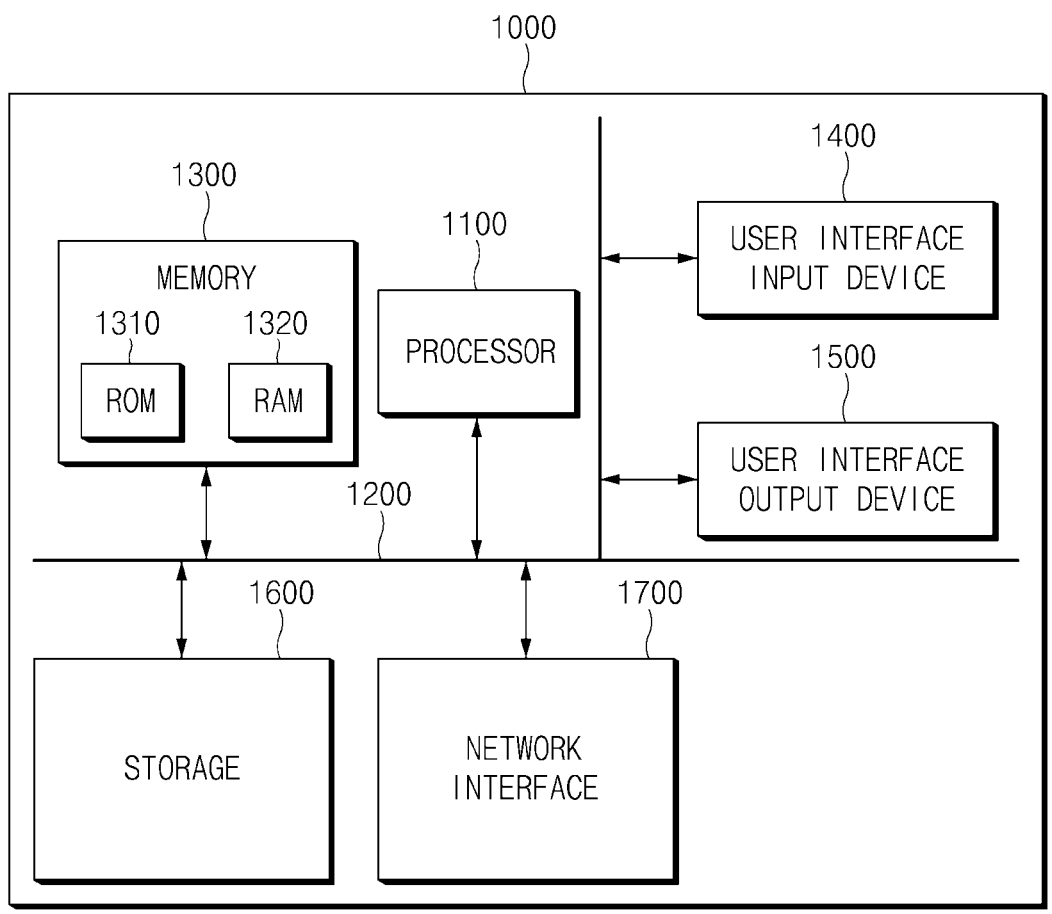
FIG. 4 is a block diagram illustrating a computing system for executing a battery management method of a vehicle according to one form of the present disclosure.

FIG. 4 is a block diagram illustrating a computing system for executing a battery management method of a vehicle according to each form of the present disclosure.

Referring to FIG. 4, the battery management method of the vehicle according to each form of the present disclosure described above may also be implemented through a computing system. A computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the forms disclosed herein may be embodied directly in a hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the forms disclosed in the present disclosure are not intended to limit the technical idea of the present disclosure but to illustrate the present disclosure, and the scope of the technical idea of the present disclosure is not limited by the forms. The scope of the present disclosure should be construed as being covered by the scope of the appended claims, and all technical ideas falling within the scope of the claims should be construed as being included in the scope of the present disclosure.

The device and the method for managing the batteries of the vehicle according to exemplary forms of the present disclosure may, when the failure has occurred at an arbitrary temperature sensor among the plurality of temperature sensors arranged on the batteries of the vehicle, estimate the temperature value of the temperature sensor where the failure (e.g., the disconnection) has occurred using the big data, and manage the discharge of the batteries based on the estimated temperature value and the temperature values of the remaining temperature sensors, thereby preventing the acceleration of the battery deterioration.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:
1. A device for managing batteries of a vehicle, the device comprising:
   a plurality of temperature sensors mounted at different locations of the batteries; and
   a controller configured to:

when a failure has occurred at a temperature sensor among the plurality of temperature sensors, estimate a temperature value at the failed temperature sensor based on data accumulated from operations of the batteries; and control discharge of the batteries based on the estimated temperature value at the failed temperature sensor, wherein the controller is configured to estimate the temperature value at the failed temperature sensor based on an average value of difference values between highest temperatures and lowest temperatures in respective periods of time.

2. The device of claim 1, wherein the controller is configured to estimate the temperature value at the failed temperature sensor based on the average value of difference values between highest temperatures and lowest temperatures in respective periods of time, information on a temperature sensor (S_MaxT) which more frequently measures the highest temperature than other remaining temperature sensors among the plurality of temperature sensors, and temperature values of the remaining temperature sensors.

3. The device of claim 2, wherein the controller is configured to:
calculate a sum of the average value and a maximum value among the temperature values measured by the remaining temperature sensors when the failed temperature sensor and the temperature sensor (S_MaxT) are mounted at the same locations of respective batteries; and
estimate the calculated sum as the temperature value at the failed temperature sensor.

4. The device of claim 2, further comprising:
a storage configured to store the average value of the difference values between the highest temperatures and the lowest temperatures in the respective periods of time, and the information on the temperature sensor (S_MaxT).

5. The device of claim 2, wherein the controller is configured to collect the average value of the difference values between the highest temperatures and the lowest temperatures in the respective periods of time, and the information on the temperature sensor (S_MaxT) from a data server when the failure has occurred at the temperature sensor among the plurality of temperature sensors.

6. The device of claim 5, wherein the data server is configured to:
periodically collect temperature values measured by the plurality of temperature sensors mounted on the batteries of the same vehicle;
calculate the difference values between the highest temperatures and the lowest temperatures in the respective periods of time; and
calculate the average value of the difference values in an accumulating manner, and repeatedly identify the temperature sensor (S_MaxT) more frequently measuring the highest temperature among the plurality of temperature sensors.

7. The device of claim 6, wherein the data server is configured to discard a temperature value collected when a failure has occurred at the batteries of the same vehicle without using as the data.

8. The device of claim 1, wherein the controller is configured to estimate the temperature value at the failed temperature sensor based on the average value of difference values between highest temperatures and lowest temperatures in respective periods of time, information on a temperature sensor (S_MinT) which more frequently measures the lowest temperature than other remaining temperature sensors among the plurality of temperature sensors, and temperature values of the remaining temperature sensors.

9. The device of claim 8, wherein the controller is configured to:
subtract the average value of the difference values between the highest temperatures and the lowest temperatures in the respective periods of time from a minimum value among the temperature values measured by the remaining temperature sensors when the failed temperature sensor and the temperature sensor (S_MinT) are mounted at the same locations of respective batteries; and
estimate the subtracted value as the temperature value at the failed temperature sensor.

10. The device of claim 8, further comprising:
a storage configured to store the average value of the difference values between the highest temperatures and the lowest temperatures in the respective periods of time, and the information on the temperature sensor (S_MinT).

11. The device of claim 8, wherein the controller is configured to collect the average value of the difference values between the highest temperatures and the lowest temperatures in the respective periods of time, and the information on the temperature sensor (S_MinT) from a data server when the failure has occurred at the temperature sensor among the plurality of temperature sensors.

12. The device of claim 11, wherein the data server is configured to:
periodically collect temperature values measured by the plurality of temperature sensors mounted on the batteries of the same vehicle;
calculate the difference values between the highest temperatures and the lowest temperatures in the respective periods of time; and
calculate the average value of the difference values in an accumulating manner, and repeatedly identify the temperature sensor (S_MinT) more frequently measuring the lowest temperature among the plurality of temperature sensors.

13. The device of claim 12, wherein the data server is configured to discard a temperature value collected when a failure has occurred at the batteries of the same vehicle without using as the data.

14. A method for managing batteries of a vehicle including a plurality of temperature sensors mounted at different locations of the batteries, the method comprising:
determining, by a controller, whether a failure has occurred at a temperature sensor among the plurality of temperature sensors;
estimating, by the controller, a temperature value at the failed temperature sensor based on an average value of difference values between highest temperatures and lowest temperatures in respective periods of time; and
managing, by the controller, discharge of the batteries based on the estimated temperature value.

15. The method of claim 14, wherein estimating the temperature value at the failed temperature sensor includes:
collecting the average value of the difference values between the highest temperatures and the lowest temperatures in the respective periods of time, and information on a temperature sensor (S_MaxT) which more frequently measures the highest temperature than other remaining temperature sensors among the plurality of temperature sensors from a data server;

calculating a sum of the average value of the difference values and a maximum value among the temperature values measured by the remaining temperature sensors when the failed temperature sensor and the temperature sensor (S_MaxT) are mounted at the same locations of respective batteries; and estimating the calculated sum as the temperature value at the failed temperature sensor.

16. The method of claim 15, wherein collecting the information includes:

periodically collecting temperature values measured by the plurality of temperature sensors mounted on the batteries of the same vehicle;

calculating the difference values between the highest temperatures and the lowest temperatures in the respective periods of time; and calculating the average value of the difference values in an accumulating manner, and repeatedly identifying the temperature sensor (S_MaxT) more frequently measuring the highest temperature among the plurality of temperature sensors.

17. The method of claim 14, wherein estimating the temperature value at the failed temperature sensor includes:

collecting the average value of the difference values between the highest temperatures and the lowest temperatures in the respective periods of time, and information on a temperature sensor (S_MinT) which more frequently measures the lowest temperature than other remaining temperature sensors among the plurality of temperature sensors, and temperature values of the remaining temperature sensors from a data server;

subtracting the average value of the difference values from a minimum value among the temperature values measured by the remaining temperature sensors when the failed temperature sensor and the temperature sensor (S_MinT) are mounted at the same locations of respective batteries; and estimating the subtracted value as the temperature value at the failed temperature sensor.

18. The method of claim 17, wherein collecting the information includes:

periodically collecting temperature values measured by the plurality of temperature sensors mounted on the batteries of the same vehicle;

calculating the difference values between the highest temperatures and the lowest temperatures in the respective periods of time; and calculating the average value of the difference values in an accumulating manner, and repeatedly identifying the temperature sensor (S_MinT) more frequently measuring the lowest temperature among the plurality of temperature sensors.

* * * * *